United States Patent
Tange et al.

(10) Patent No.: US 6,998,004 B2
(45) Date of Patent: Feb. 14, 2006

(54) COMPOSITE SHEET AND PROCESS FOR MAKING THE SAME

(75) Inventors: Satoru Tange, Kagawa-ken (JP); Hiroyuki Ohata, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 296 days.

(21) Appl. No.: 10/292,040

(22) Filed: Nov. 12, 2002

(65) Prior Publication Data

US 2003/0070744 A1    Apr. 17, 2003

Related U.S. Application Data

(62) Division of application No. 09/821,230, filed on Mar. 29, 2001.

(30) Foreign Application Priority Data

Mar. 31, 2000  (JP)  ............................... 2000-099888

(51) Int. Cl.
*A61F 13/15*    (2006.01)

(52) U.S. Cl. ...................... 156/163; 156/164; 156/229

(58) Field of Classification Search ................ 156/160, 156/163, 164, 229
See application file for complete search history.

(56) References Cited

U.S. PATENT DOCUMENTS

| | | | | |
|---|---|---|---|---|
| 4,209,563 A | * | 6/1980 | Sisson | 442/329 |
| 5,116,662 A | * | 5/1992 | Morman | 428/198 |
| 5,393,599 A | | 2/1995 | Quantrille et al. | |
| 6,465,073 B1 | * | 10/2002 | Morman et al. | 428/103 |

FOREIGN PATENT DOCUMENTS

| | | |
|---|---|---|
| EP | 0 688 665 | 12/1995 |
| EP | 0 803 602 | 10/1997 |
| EP | 1 066 957 | 1/2001 |
| JP | 6-184897 | 7/1994 |
| WO | WO-92/16366 A1 * | 10/1992 |
| WO | WO 95/19258 | 7/1995 |

OTHER PUBLICATIONS

Patent Abstracts of Japan, vol. 097, No. 009, Sep. 30, 1997 & JP 09132856 A (OJI Paper Co Ltd), May 20, 1997.

* cited by examiner

*Primary Examiner*—Jeff H. Aftergut
(74) *Attorney, Agent, or Firm*—Butzel Long

(57) ABSTRACT

A composite sheet that comprises an elastically stretchable layer and an inelastically stretchable layer formed with inelastically stretchable continuous fibers bonded to at least one surface of the elastically stretchable layer intermittently in one direction. The continuous fibers are oriented substantially in one direction thereof so that the composite sheet may present a ratio $S_1/S_2$ of 3.0 or higher where $S_1$ represents a tensile strength in this one direction and $S_2$ represents a tensile strength in the direction orthogonal to this one direction.

6 Claims, 3 Drawing Sheets

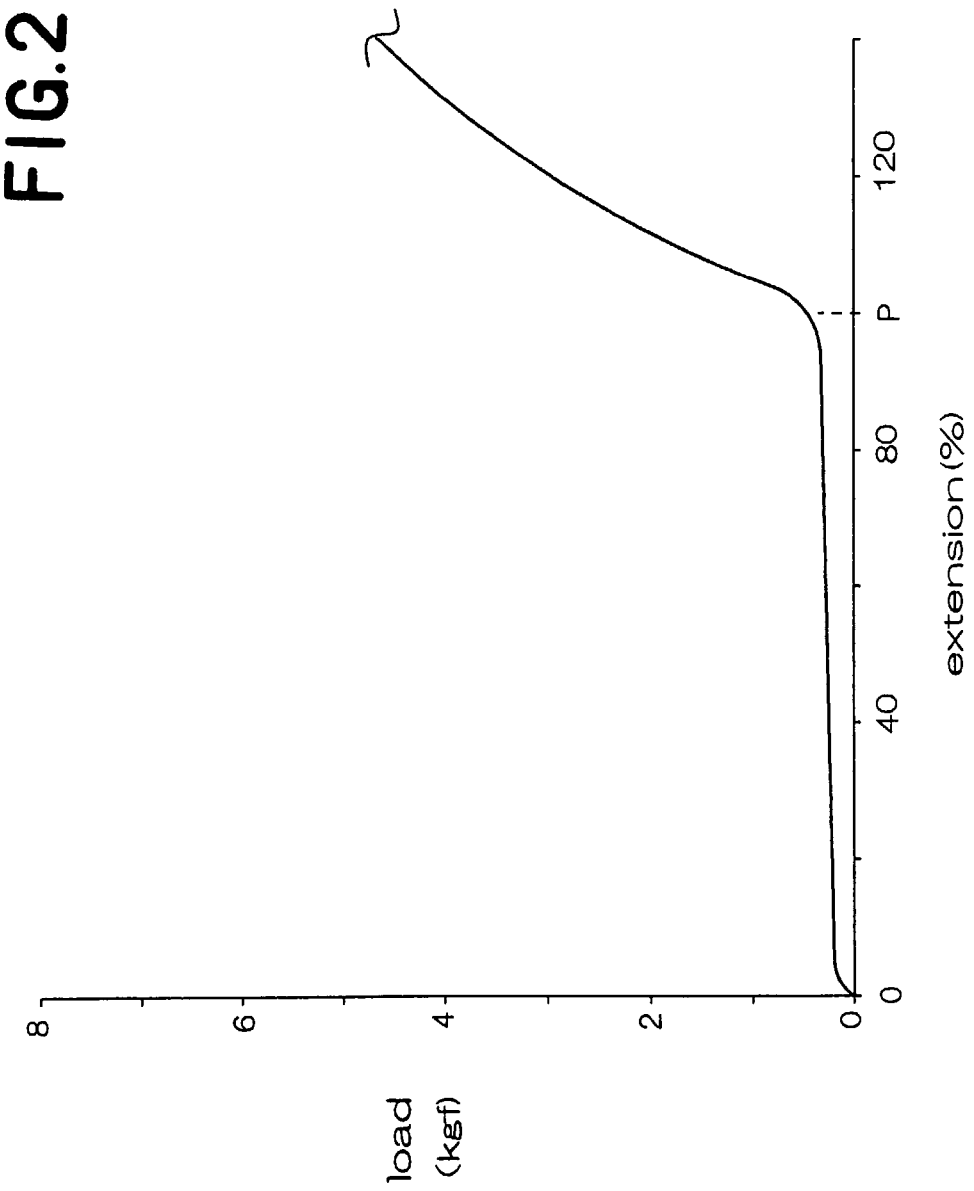

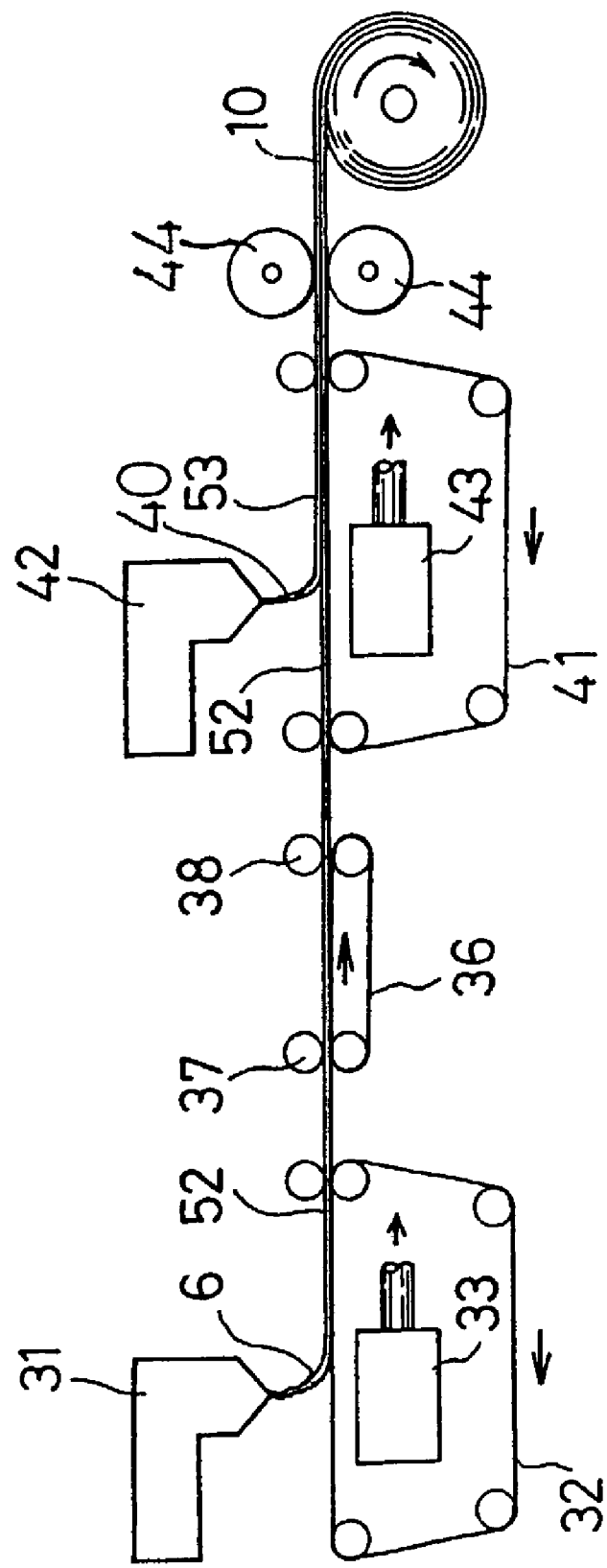

COMPOSITE SHEET AND PROCESS FOR MAKING THE SAME

RELATED APPLICATION

This is a Divisional of U.S. patent application Ser. No. 09/821,230, filed on Mar. 29, 2001.

BACKGROUND OF THE INVENTION

This invention relates to a composite sheet comprising an elastically stretchable web and an inelastically stretchable web formed with inelastically stretchable continuous fibers and also to a process for making the composite sheet.

Japanese Patent Application Publication No. 1994-184897A describes elastically stretchable composite stock material obtained by a process comprising steps of stretching inelastic material to neck this material, bonding this material as it is necked to an elastically stretchable sheet which is under a tension at three or more non-linearly arranged regions and finally relieving the stretchable sheet of its tension. So far as the necked material is of fibrous nature, such process of prior art enables the necked material to form a plurality of gathers as the elastically stretchable sheet is relieved of its tension and thereby to convert a rubber-like touch peculiar to the surface of the elastically stretchable sheet to a comfortable cloth-like touch without deterioration of a desired stretchability of the elastically stretchable sheet.

According to this technique of prior art, the necked material is obtained by stretching, for example, a spun bond nonwoven fabric comprising thermoplastic synthetic fibers fused together in one direction. Of the fibers unevenly distributed in this nonwoven fabric, some are plastically deformed in the one direction and thereby actually stretched while the others are merely reoriented in the one direction as the nonwoven fabric is stretched in the one direction. The actual stretched fibers have their diameters reduced and the merely reoriented fibers maintain their initial diameters. Consequently, the elastically stretchable composite stock material obtained in this manner is disadvantageously accompanied with a remarkable unevenness of the fiber diameters. This may lead to the unevenness in touch as well as in appearance of the product.

SUMMARY OF THE INVENTION

It is an object of this invention to provide a composite sheet that comprises an elastically stretchable layer and an inelastically stretchable fibrous layer in which the unevenness of the fiber diameter in the inelastically stretchable fibrous layer is minimized and a process for making such a sheet.

The object set forth above is achieved, according to one aspect of this invention, by a novel composite sheet and, according to another aspect of this invention, by a novel process for making this novel composite sheet.

This invention relates to, in one aspect thereof, the composite sheet comprising an elastically stretchable layer having upper and lower surfaces and an inelastically stretchable fibrous layer formed with inelastically stretchable continuous fibers, these two layers being bonded together intermittently in first and second directions orthogonal to each other, at least, in the first direction.

In such a composite sheet, the continuous fibers are oriented substantially in the one direction so that a tensile strength $S_1$ of the composite sheet in the first direction and a tensile strength $S_2$ of the composite sheet in the second direction may define a ratio $S_1/S_2$ of 3.0 or higher.

This invention relates to, in another aspect thereof, a process for making the composite sheet by bonding an elastically stretchable layer having upper and lower surfaces and an inelastically stretchable fibrous layer put on at least one of the upper and lower surfaces to each other intermittently in first and second directions orthogonal to each other, at least, in said first direction.

In such a process, the continuous fibers lie one upon another substantially without being bonded together to form the inelastically stretchable web and that the web is, in turn, bonded to the elastically stretchable web after the continuous fibers have been oriented substantially in the one direction.

According to one embodiment of the invention, the process comprises the steps of extruding the continuous fibers from a melt extruder, collecting the continuous fibers on a conveyor running in one direction to form the inelastically stretchable web, orienting the continuous fibers substantially in the one direction and at the same time placing the continuous fibers upon the elastically stretchable web and finally bonding these two webs together intermittently in the one direction to obtain the composite sheet.

According to another embodiment of the invention, the step of orienting said continuous fibers substantially in said one direction including the use of a first conveyor running at a velocity $V_1$ and a second conveyor provided downstream of the first conveyor and running at a velocity $V_2$ so that a ratio $V_2/V_1$ may lie in a range of 1.05~10.

BRIEF DESCRIPTION OF THE DRAWINGS

FIG. 2 is a graphic diagram plotting a load/extension percentage curve; and

FIG. 3 is a diagram schematically illustrating the process for making a composite sheet according to one embodiment of the present invention.

DETAILED DESCRIPTION OF THE PREFERRED EMBODIMENTS

Figure 1:
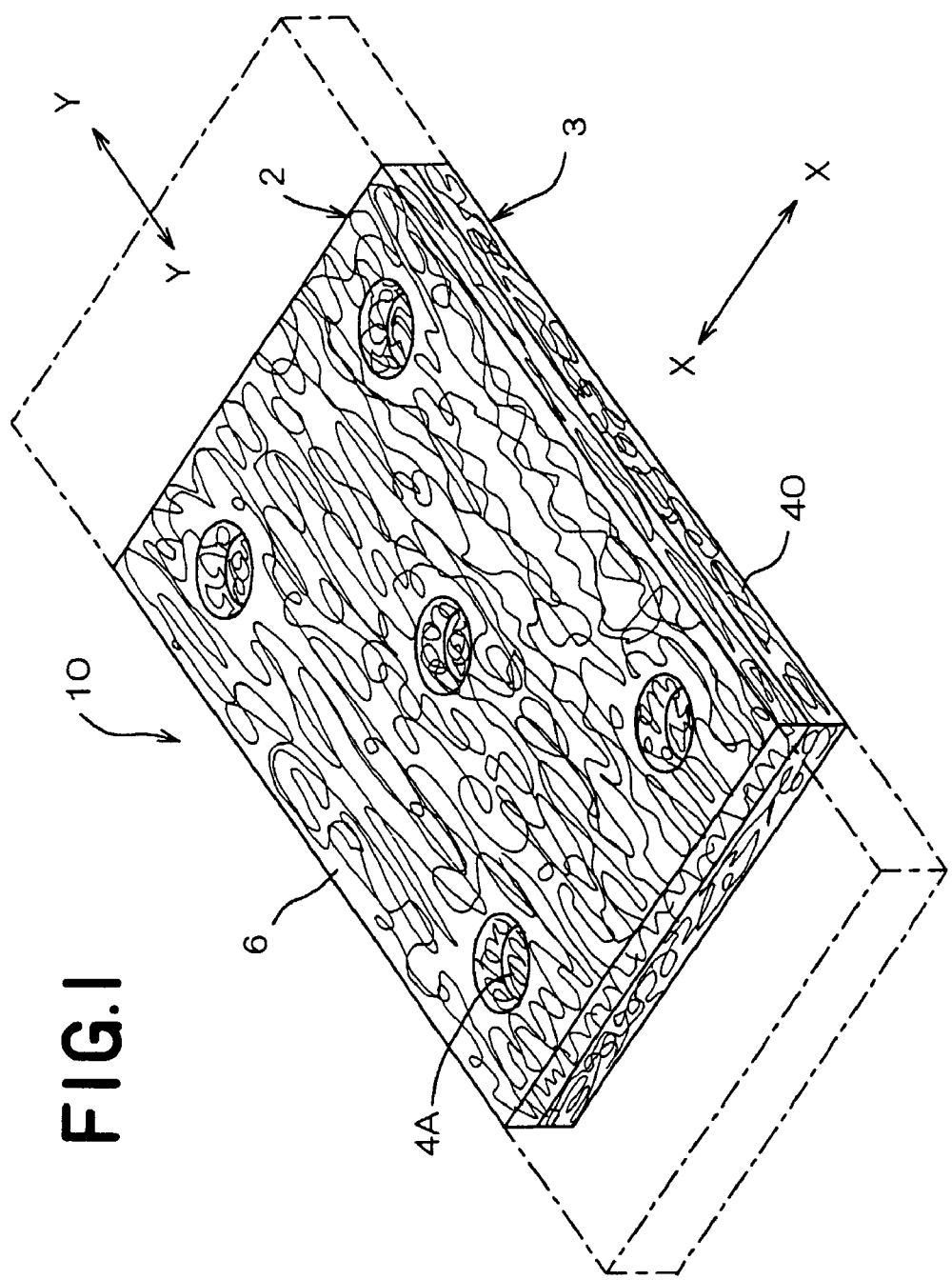
FIG. 1 is a perspective view of a composite sheet according to one embodiment of the present invention.

Details of the composite sheet and the process for making the same according to this invention will be more fully understood from the description given hereunder with reference to the accompanying drawings.

A composite sheet 10 depicted by FIG. 1 in a perspective view comprises an elastically stretchable layer 3 formed by continuous fibers 40 of styrene-based elastomer and an inelastically stretchable layer 2 formed with an inelastically stretchable polypropylene continuous fibers 6 fused with upper surface of the elastically stretchable layer 3 at bonding regions 4A. The composite sheet 10 has X-direction and Y-direction being orthogonal to the X-direction so that the layer 3 is elastically stretchable at least in Y-direction of the X- and Y-direction. The continuous fibers 6 of the inelastically stretchable layer 2 are oriented so as to extend substantially in Y-direction. In the case wherein the elastically stretchable layer 3 has a substantially same tensile strength in X- and Y-directions, a degree of orientation of the continuous fibers 6 can be expressed by a ratio $S_1/S_2$ where Si represents a tensile strength as measured in Y-direction and $S_2$ represents a tensile strength as measured in X-direction. For the composite sheet 10 according to this invention, the continuous fibers 6 are preferably oriented with a ratio $S_1/S_2$ of 3.0 or higher. Except at the bonding regions, the continuous fibers 6 are neither fused nor bonded together but substantially brought into close contact with one another. In other words, the aggregative strength among these fibers 6 are extremely feeble so that the continuous fibers 6 are easily separated from one another as the composite sheet 10 is slightly stretched in Y-direction.

Assumed that the composite sheet 10 is stretched in Y-direction with tensile force such that breaking extensions of the two layers 2, 3 are not exceeded and an elasticity limit of the elastically stretchable layer 3 is not exceeded, the layer 3 is elastically stretched while the layer 2 is inelastically stretched. As a result, the continuous fibers 6 of the layer 2 are plastically deformed so as to be thinned and lengthened. Relieved of the stretching force, the composite sheet 10 contracts substantially to its initial dimension under contractible force provided by the layer 3. Thereupon, the continuous fibers 6 having been inelastically stretched form a plurality of gathers and the layer 2 of these continuous fibers 6 become more bulky than before stretched. In this way, the layer 2 offers a comfortably soft touch.

FIG. 2 is a graphic diagram plotting a load/extension percentage curve observed as the composite sheet 10 is stretched anew after the sheet 10 has been once stretched until the extension percentage reaches 150%. Specific construction of the composite sheet 10 will be described below. The extension percentage of the composite sheet 10 for the first time of stretching is defined as the initial extension percentage $E_I$.

In the inelastically stretchable layer:
  inelastically stretchable continuous fibers:
  polypropylene/terpolymer of propylene, ethylene and butene=60/40 (weight ratio)
  fiber diameter: 15.2 μm
  basis weight: 15 g/m²

In the elastically stretchable layer:
  elastically stretchable continuous fibers: styrene-based elastomer
  fiber diameter: 16.4 μm
  basis weight: 60 g/m²

Tensile strength ratio ($S_1/S_2$) of the composite sheet: 4.9

As will be apparent from FIG. 2, the curve gently rises and then reaches a inflection point P corresponding to an extension percentage of 100% under a substantially uniform load. From this inflection point, the curve sharply rises. Specifically, the gathers formed with the continuous fibers 6 of the inelastically stretchable layer 2 are flattened and the layer 3 is elastically stretched to the inflection point P as the composite sheet 10 is stretched. After the inflection point P, the continuous fibers 6 are plastically deformed so as to be thinned and lengthened while the layer 3 continues to be elastically stretched. The load/extension percentage curve thus indicates that, in the composite sheet 10 having been initially stretched until the extension percentage reaches 150%, the layer 3 can be elastically stretched for the second time with a relatively low stress until the extension percentage reaches 100% substantially without being affected by the presence of the layer 2. The extension percentage at which the composite sheet 10 can be stretched with a relatively low load for the second time until the inflection point P is reached is defined as the secondary extension percentage $E_S$. $E_S/E_I$, the ratio of this secondary extension percentage $E_S$ to the initial extension percentage $E_I$, is defined as the stretch efficiency $S_E$. In the case illustrated by the graphic diagram of FIG. 2, the stretch efficiency $S_E$ is given by 100(%)/150(%)×100=67(%). In the composite sheet 10, the continuous fibers 6 are oriented substantially in Y-direction. Therefore, most of the continuous fibers 6 are stretched in Y-direction and lengthened as the composite sheet 10 is stretched in Y-direction and a stretch efficiency $S_E$ as high as in the order of 60~90% is achieved. In the contrast with this composite sheet 10, the composite sheet of prior art in which the continuous fibers 6 are distributed at random presents a stretch efficiency $S_E$ less than 60%.

FIG. 3 is a diagram schematically illustrating the process for making the composite sheet 10. At the left hand in the diagram, a first extruder 31 adapted to discharge the continuous fibers 6, a first conveyor belt 32 and a suction box 33 are illustrated. The continuous fibers 6 discharged from the first extruder 31 are collected on the first conveyor belt 32 and form inelastically stretchable web 52 under an effect of hot air blast (not shown) ejected sideward with respect to nozzle arrays of the first extruder 31 in combination with an effect of the suction box 33. An extruding condition of the first extruder 31, a cooperating condition of hot air and suction, a cooling condition for the continuous fibers 6 and a velocity $V_1$ of the first conveyor belt 32 are appropriately adjusted to prevent the continuous fibers 6 from being fused together or to minimize such fusion.

The inelastically stretchable web 52 is then transferred onto a second conveyor belt 36. The second conveyor belt 36 runs at a velocity $V_2$ and two pairs of pressure rolls 37, 38 rotate at a peripheral velocity $V_2$. A ratio $V_2/V_1$ is in a range of 1.05~10. The inelastically stretchable web 52 is stretched in the machine direction with the continuous fibers 6 being reoriented in the machine direction as the web 52 is transferred from the first conveyor belt 32 onto the second conveyor belt 36. The continuous fibers 6, even if they have been fused together to some extent in the precedent step, are reliably separated apart from one another on the second conveyor belt 36.

Now the inelastically stretchable web 52 is transferred from the second conveyor belt 36 onto a third conveyor belt 41. Elastomeric continuous fibers 40 are discharged from a second extruder 42 and accumulated on the inelastically stretchable web 52 to form elastically stretchable web 53 under a suction effect of a suction box 43. These two webs 52, 53 are bonded together at the binding regions 4A which are formed as the two webs 52, 53 pass a pair of heat-embossing rolls 44, 44. In this manner, the composite sheet 10 is obtained.

According to the process as has been described above, the relationship between the velocity $V_1$ of the first conveyor belt 32 and the velocity $V_2$ of the second conveyor belt 36 is preferably adjusted to $V_2/V_1=1.05~10$. The velocity ratio $V_2/V_1=1.05~10$ ensures an orientation degree of the continuous fibers 6 sufficient to achieve a stretch efficiency $S_E$ of the composite sheet 10 as high as 60~90%. The composite sheet 10 with the continuous fibers sufficiently oriented in this manner presents a ratio $S_1/S_2$ of 3.0 or higher where $S_1$ represents a tensile strength $S_1$ in the machine direction and $S_2$ represents a tensile strength in the direction orthogonal to the machine direction.

The composite sheet 10 is not limited to the illustrated embodiment and it is possible without departing from the scope of the invention to place the inelastically stretchable layers 2 upon both surfaces of the elastically stretchable layer 3. To this end, the process illustrated in FIG. 3 may be correspondingly added with a third extruder and a plurality of conveyor belts.

The composite sheet according to this invention comprises a plurality of inelastically stretchable continuous fibers that are evenly stretched as these continuous fibers are stretched in one direction since they are oriented substantially in the one direction. Consequently, a possible unevenness in the fiber diameter after stretched and therefore in touch as well as in appearance can be minimized.

The process according to this invention comprises the steps adapted to orient the inelastically stretchable continuous fibers substantially in one direction. In this way, the process of this invention facilitates the composite sheet to be made.

What is claimed is:

1. A process for making a composite sheet which comprises:
   providing an elastically stretchable layer having upper and lower surfaces;
   providing an inelastically stretchable fibrous web formed from inelastically stretchable continuous fibers that are formed with a melt extruder and subjected to hot air blast sideways relative to a nozzle of the melt extruder and suction from a suction box, said inelastically stretchable continuous fibers being substantially unfused to one another;
   orienting said inelastically stretchable continuous fibers in said inelastically stretchable fibrous web in a first direction while separating any fused ones of said inelastically stretchable continuous fibers;
   positioning said inelastically stretchable fibrous web on at least one of the upper and lower surfaces of the elastically stretchable layer; and
   intermittently bonding said elastically stretchable layer and said inelastically stretchable fibrous web to each other in said first direction and a second direction orthogonal to said first direction.

2. The process according to claim 1, wherein the step of orienting said inelastically stretchable continuous fibers substantially in said first direction comprises conveying said inelastically stretchable continuous fibers on a first conveyor running at a velocity $V_1$ and on a second conveyor provided downstream of said first conveyor, said second conveyor running at a velocity $V_2$ so that a ratio $V_2/V_1$ is within a range of about 1.05 to 10.

3. The process according to claim 1, wherein said inelastically stretchable continuous fibers are oriented in said first direction so that a tensile strength $S_1$ of said composition sheet in said first direction and a tensile strength $S_2$ of said composite sheet in the second direction as a ratio $S_1/S_2$ of 3.0 or higher.

4. A process for making a composite sheet comprising the steps of:
   extruding inelastically stretchable continuous fibers from a melt extruder while subjecting the extruded fibers to hot air blast sideways relative to a nozzle of the melt extruder and suction from a suction box;
   collecting said extruded inelastically stretchable continuous fibers on a conveyor running in one direction to form an inelastically stretchable web;
   orienting said inelastically stretchable continuous fibers in said inelastically stretchable web so that they extend substantially in said one direction and so as to separate any fused ones of said inelastically stretchable continuous fibers;
   providing an elastically stretchable web;
   placing said inelastically stretchable continuous web upon said elastically stretchable web; and
   bonding said inelastically stretchable web to said elastically web together intermittently in said one direction to obtain said composite sheet.

5. The process according to claim 4, wherein the step of orienting said inelastically stretchable continuous fibers substantially in said first direction comprises conveying said inelastically stretchable continuous fibers on a first conveyor running at a velocity $V_1$ and on a second conveyor provided downstream of said first conveyor, said second conveyor running at a velocity $V_2$ so that a ratio $V_2/V_1$ is within a range of about 1.05 to 10.

6. The process according to claim 4, wherein said inelastically stretchable continuous fibers are oriented in said first direction so that a tensile strength $S_1$ of said composition sheet in said first direction and a tensile strength $S_2$ of said composite sheet in the second direction as a ratio $S_1/S_2$ of 3.0 or higher.

* * * * *